(12) United States Patent
Bosscher et al.

(10) Patent No.: US 9,478,064 B2
(45) Date of Patent: Oct. 25, 2016

(54) AUTOMATIC CONTROL OF AVATAR PERSPECTIVE VIEW IN A GRAPHICAL USER INTERFACE

(71) Applicant: HARRIS CORPORATION, Melbourne, FL (US)

(72) Inventors: Paul M. Bosscher, West Melbourne, FL (US); Matthew D. Summer, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 80 days.

(21) Appl. No.: 14/608,613

(22) Filed: Jan. 29, 2015

(65) Prior Publication Data

US 2016/0225182 A1   Aug. 4, 2016

(51) Int. Cl.

| | |
|---|---|
| *G06T 15/20* | (2011.01) |
| *G06F 3/0481* | (2013.01) |
| *G06F 3/0484* | (2013.01) |
| *G05D 1/00* | (2006.01) |
| *B25J 13/00* | (2006.01) |

(52) U.S. Cl.
CPC .............. *G06T 15/20* (2013.01); *B25J 13/006* (2013.01); *G05D 1/0011* (2013.01); *G06F 3/0484* (2013.01); *G06F 3/04815* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 5,511,147 A | 4/1996 | Abdel-Malek | |
| 6,535,793 B2 | 3/2003 | Allard | |
| 6,642,922 B1 * | 11/2003 | Noda | B25J 9/1671 345/419 |
| 7,843,431 B2 | 11/2010 | Robbins et al. | |
| 2010/0208945 A1 * | 8/2010 | Te Vrugt | A63B 24/0003 382/107 |
| 2011/0235066 A1 * | 9/2011 | Sakuragi | G06T 7/0022 358/1.6 |

* cited by examiner

*Primary Examiner* — King Poon
*Assistant Examiner* — Vincent Peren
(74) *Attorney, Agent, or Firm* — Fox Rothschild LLP; Robert J. Sacco; Carol E. Thorstad-Forsyth (57) ABSTRACT

Systems (100) and methods (800) for visually rendering a multi-dimensional model of a portion of a system (100) having mechanical joints (228-238). The methods comprise: determining a first current physical joint configuration of a first mechanical joint and a second current physical joint configuration of a second mechanical joint; determining at least one first viewing direction ($d_{234}$) along a rotational axis or perpendicular to a linear extension axis ($a_{234}$) of the first mechanical joint (234) having the first current physical joint configuration and at least one second viewing direction ($d_{236}$) along a rotational axis or perpendicular to a linear extension axis ($a_{236}$) of the second mechanical joint (236) having the second current physical joint configuration; computing an avatar view perspective direction ($\sigma_{234\text{-}236}$) based on the first and second viewing directions; and dynamically adjusting a perspective view of a visually rendered multi-dimensional model of the system using the avatar view perspective direction.

18 Claims, 8 Drawing Sheets

AUTOMATIC CONTROL OF AVATAR PERSPECTIVE VIEW IN A GRAPHICAL USER INTERFACE

FIELD OF THE INVENTION

This document relates generally to the control of virtual machines and to the remote control of a wide variety of tele-operated robots and vehicles. More particularly, this document relates to the automatic control of Graphical User Interface ("GUI") avatars.

BACKGROUND OF THE INVENTION

Many types of tele-operated robots and vehicles are well known in the art. These include wheeled robots, tracked robots, humanoid robots, robotic manipulators and complex mobility systems. One such wheeled/tracked robot is an Unmanned Ground Vehicle ("UGV").

UGVs are motorized vehicles that operate without an on-board human presence. Remotely-controlled and remotely-guided unmanned vehicles (such as UGVs) are in widespread use in applications such as Explosive Ordinance Disposal ("EOD"), search and rescue operations, hazardous material disposal, surveillance, etc. A typical UGV includes a chassis, wheels, drive motors mounted on the chassis, an articulating arm mounted on top of the chassis, grippers and a camera mounted on the arm or chassis. UGVs can also be equipped with steerable front wheels to facilitate directional control. Alternatively, UGVs can include tracks that facilitate operation over rough terrain. Steering of tracked UGVs can be effectuated by simultaneously operating the wheels or tracks on opposite sides of the UGV.

Movement and steering of a UGV can be controlled by a user from a location remote from the UGV using a joystick-equipped control unit. The control unit communicates with the UGV by way of a wireless communication link. The control unit may also be used to remotely control the UGV's robotic arm, gripper and camera. Movement of the UGV is typically controlled by modulating the velocity of the UGV in proportion to the displacement of the joystick of the control unit.

In some scenarios, a visual rendering of the UGV (e.g., a computer aided design model) is displayed to the user via a display screen of the control unit for purposes of assisting the user in controlling the UGV. A 2D or 3D model of the UGV is typically rendered using a single fixed perspective view thereof (e.g., a top, front, back or side perspective view). Multiple fixed perspective view renderings of the UGV may be simultaneously displayed in different areas of the display screen. The fixed perspective view(s) that is(are) to be used may be user-selectable. In other scenarios, the perspective view remains fixed about a yaw axis with the UGV orientation changing about another axes. Such rendering approaches provide a sub-optimal perspective view of the UGV on a display screen, which may require a user to periodically cease controlling the UGV for purposes of adjusting the fixed perspective view being used to visually render the UGV.

SUMMARY OF THE INVENTION

The present disclosure concerns implementing systems and methods for visually rendering a multi-dimensional model (e.g., a 3D model) of at least a portion of a system (e.g., a UGV) having a plurality of mechanical joints (e.g., defining part of a manipulator joint). The methods involve: determining a first current physical joint configuration of a first mechanical joint and a second current physical joint configuration of a second mechanical joint; determining at least one first viewing direction along a rotational axis or perpendicular to a linear extension axis of the first mechanical joint having the first current physical joint configuration and at least one second viewing direction along a rotational axis or perpendicular to a linear extension axis of the second mechanical joint having the second current physical joint configuration; and computing an Avatar View Perspective Direction ("AVPD") based on the first viewing direction, the second viewing direction and/or at least one preferred viewing direction. More specifically, the AVPD may comprise a weighted average of the viewing directions. The AVPD is then used to dynamically adjust a perspective view of the visually rendered multi-dimensional model of the system. The magnitude of the AVPD may be scaled prior to using the AVPD to dynamically adjust the perspective view of the visually rendered multi-dimensional model of the system.

In some scenarios, two opposing viewing directions for each mechanical joint are considered. As such, the methods further comprise: determining at least one third viewing direction opposite to the first viewing direction and a fourth viewing direction opposite to the second viewing direction; computing a plurality of AVPDs using different pair combinations of at least the first, second, third and fourth viewing directions; and using the AVPD of the plurality of AVPDs with a largest magnitude to dynamically adjust the perspective view of the visually rendered multi-dimensional model of the system.

In those or other scenarios, the perspective view of the visually rendered multi-dimensional model is automatically adjusted: many times at a pre-specified rate of change; and/or only when a newly computed AVPD is larger than a currently used AVPD by a threshold value. The yaw, pitch, roll or zoom of the visually rendered multi-dimensional model may also be constrained in response to a user-software interaction setting a value thereof.

DESCRIPTION OF THE DRAWINGS

Embodiments will be described with reference to the following drawing figures, in which like numerals represent like items throughout the figures, and in which.

DETAILED DESCRIPTION OF THE INVENTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

This disclosure relates generally to the visual rendering of tele-operated or virtual robots and vehicles. While the description provided herein describes remote control systems and methods in relationship with a specific mobile robot, the present invention is not so limited. The present invention has broad applicability for assisting in the remote control of a wide variety of tele-operated robots and vehicles. For example, the present invention can be used with wheeled/tracked robots, humanoid robots, robotic manipulators, complex mobility systems and/or camera systems (e.g., a quad-copter providing a view of a moving robotic system). Additionally, the present invention can be used in virtual machine applications (e.g., video game applications) or any application in which a mechanical system with a plurality of joints is to be remotely controlled.

Generally, systems and methods are described herein for continuously providing an optimal perspective view of a visually rendered robot or vehicle within a GUI displayed on a display screen. The methods involve automatically and dynamically adjusting the perspective view direction being used to visually render the robot or vehicle such that the user does not have to stop controlling the robot or vehicle for purposes of manually adjusting the perspective view direction being used to visually render the same.

Notably, the methods are implemented as software applications which are executable by computing processing devices, and therefore do not require any hardware modifications to control units of the robots or vehicles. The algorithms employed by the software applications are generally configured to determine a plurality of view perspective direction for an avatar at least partially based on the position/orientation of the mechanical joints of the robot or vehicle being visually rendered. Each view perspective direction is determined as a function of a direction along a mechanical joint's axis of rotation. The viewing perspective of the robot's/vehicle's visual rendering is dynamically updated using an optimal view perspective direction which was chosen from the plurality of view perspective directions (i.e., the view perspective direction which is the best for viewing the mechanical joint(s) in order to optimally view its(their) current physical joint configurations).

Figure 1:
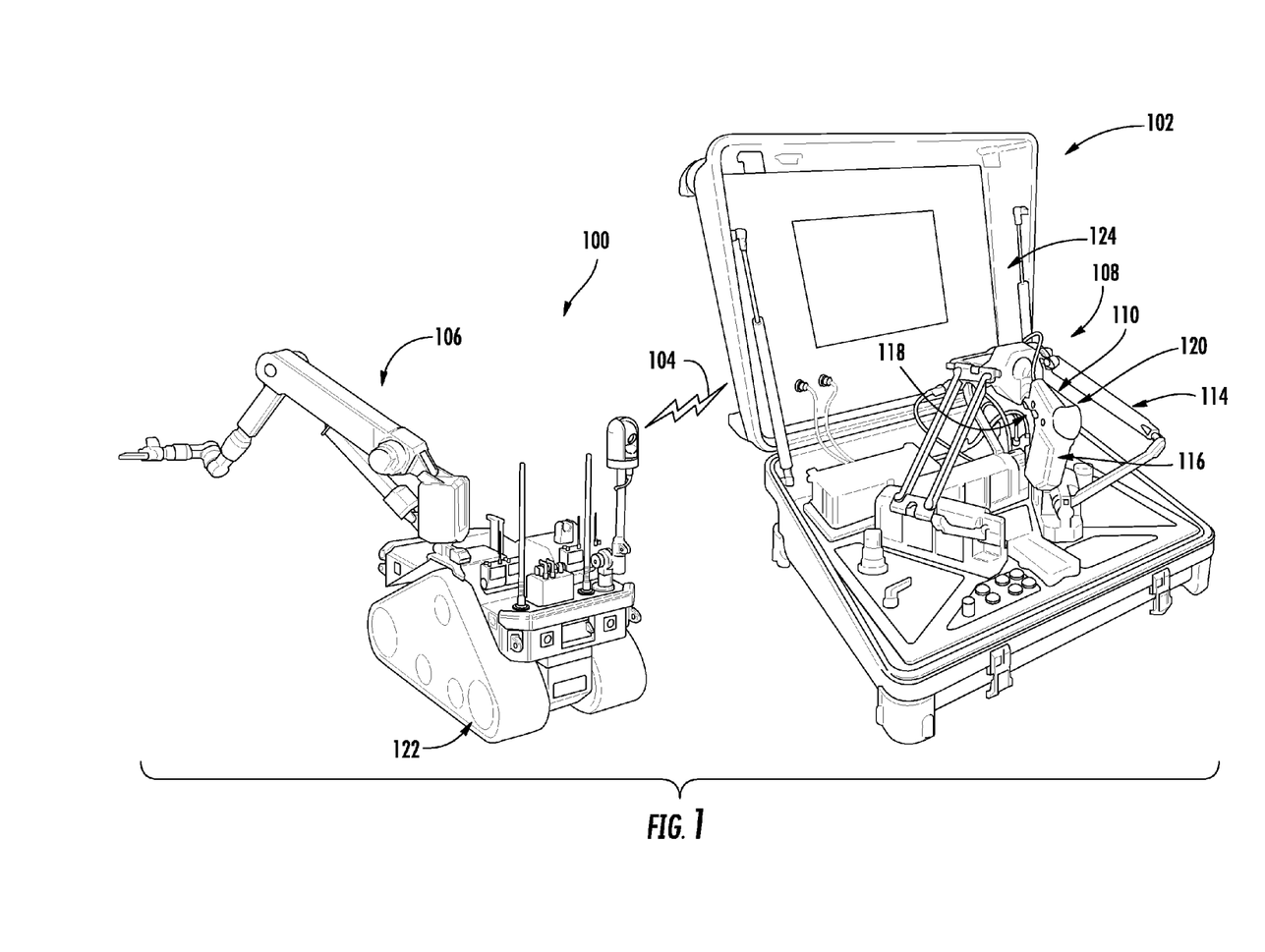
FIG. 1 is a perspective view of an UGV and a control unit.
Figure 2:
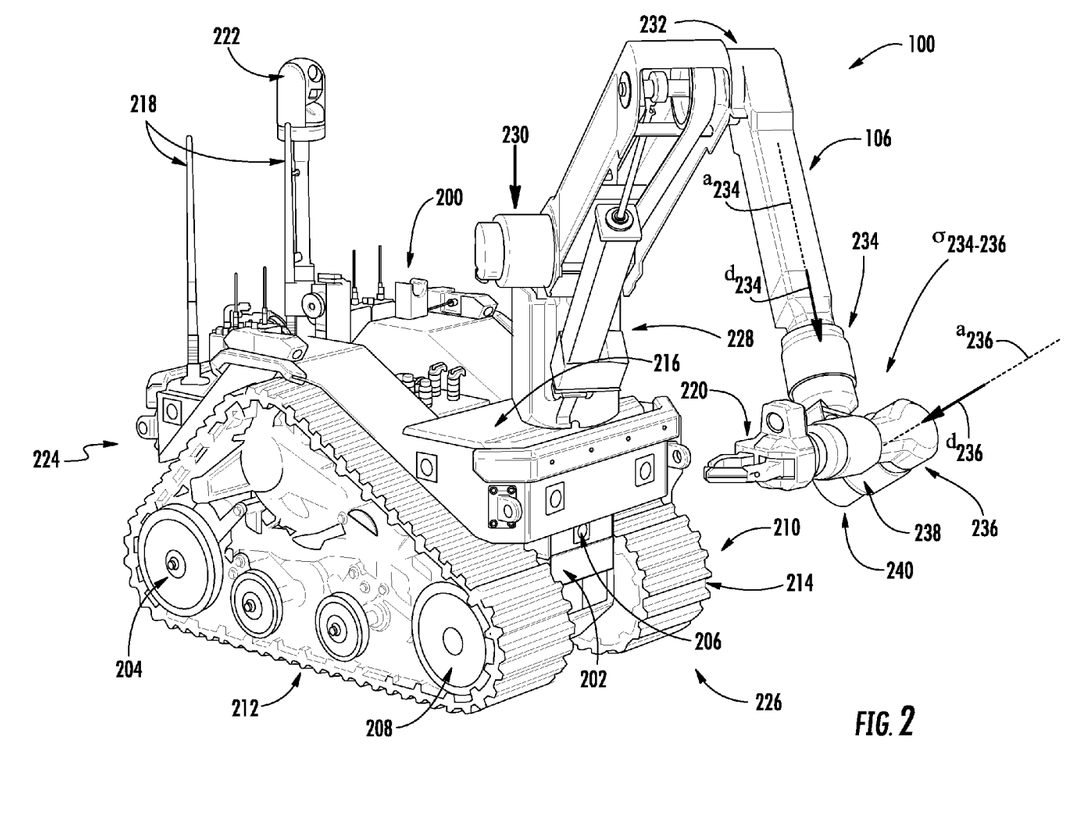
FIG. 2 is a perspective view of the vehicle shown in FIG. 1.

Referring now to FIGS. 1-4, there are provided schematic illustrations of an exemplary UGV 100 and control unit 102. The schematic illustrations of the UGV 100 and control unit 102 shown in FIGS. 1-2 are not drawn to scale. For example, the UGV 100 can be significantly larger than the control unit 102. However, FIGS. 1-2 are sufficient for understanding the present invention, and relationship between the two electronic components 100 and 102.

The UGV 100 is a motorized vehicle that operates without an on-board human presence. The UGV 100 can be used in various applications, such as EOD applications, search and rescue applications, hazardous material disposal applications, and/or surveillance applications. The UGV 100 can be remotely controlled using the control unit 102. In this regard, the control unit 102 enables a user's control of the UGV's operations and movement from a remote location.

The UGV 100 includes a body 200 comprising a rigid chassis 202. The UGV 100 also includes movable elements in the form of two rear wheels 204, 122 and two front wheels 208, 210. The rear wheels 204, 122 are mounted proximate a rear-end 224 of the rigid chassis 202 on opposite sides thereof. The front wheels 208, 210 are mounted proximate the frontend 226 of the rigid chassis 202 on opposite sides thereof. In alternative embodiments, the movable elements can be structures other than wheels, such as articulating legs.

Figure 3:
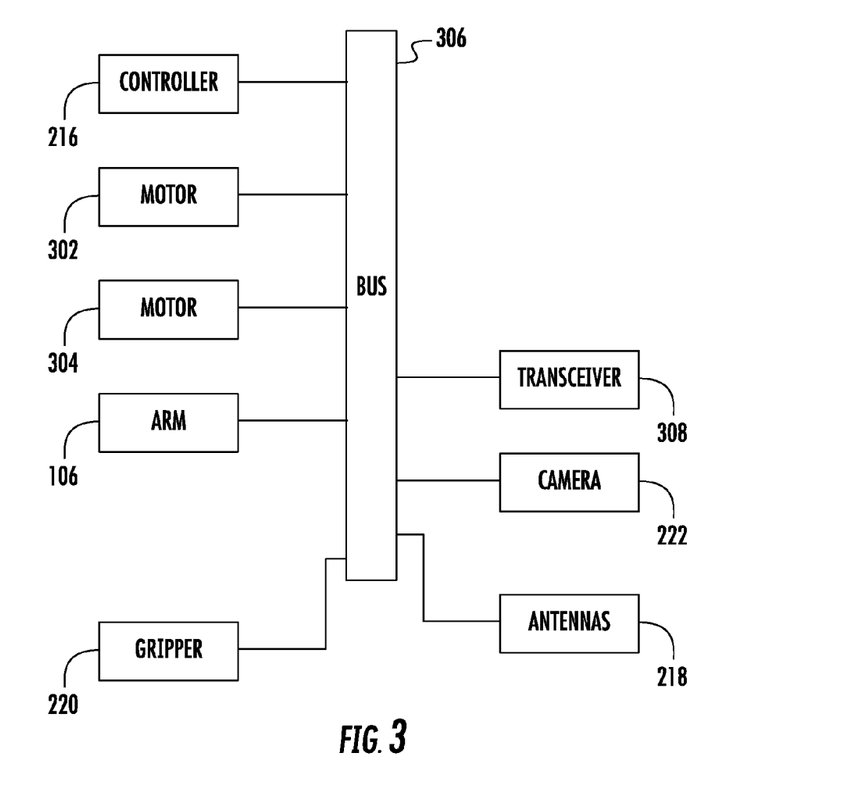
FIG. 3 is a schematic illustration of various electrical and electronic components of the vehicle shown in FIGS. 1-2.

The UGV 100 further comprises actuating devices in the form of two variable-speed, reversible electric motors 302, 304. The motors 302, 304 are mounted on the body 200. The motor 302 is coupled to the front wheel 208 so that activation of the motor 302 causes the front wheel 208 to rotate. The motor 304 is coupled to the front wheel 210 so that activation of the motor 304 causes the front wheel 210 to rotate. Additional motors (not shown) can be employed for directly driving the rear wheels 204, 122.

The rear wheel 204 and the front wheel 208 are located on the same side of the UGV 100. The rear wheel 204 and the front wheel 208 are coupled by way of a tread or track 212. Rotation of the front wheel 208 drives the track 212, which in turn causes the rear wheel 204 to rotate. Similarly, the rear wheel 122 and the front wheel 210 are located on the same side of the UGV 100. The rear wheel 122 and the front wheel 210 are coupled by way of a tread or track 214. Rotation of the front wheel 210 drives the track 214, which in turn causes the rear wheel 122 to rotate.

Figure 4:
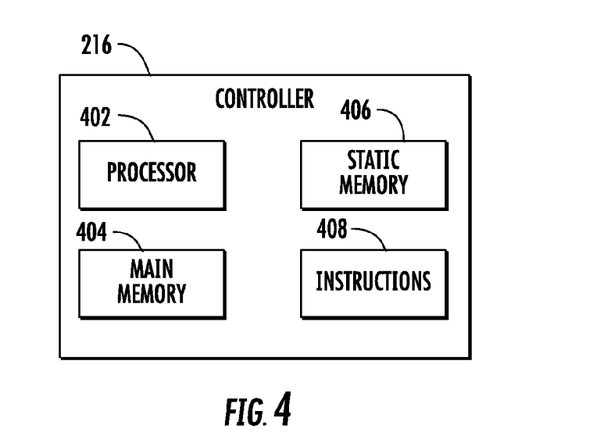
FIG. 4 is a schematic illustration of various electrical and electronic components of the controller shown in FIG. 3.

The UGV 100 further includes a controller 216. The controller 216 comprises a processor 402 (e.g., a Central Processing Unit ("CPU")), a main memory 404 and a static memory 406. These electronic components 402-406 communicate with each other via a bus 306. The static memory 406 stores one or more sets of instructions 408 (e.g., software code). The instructions 408 implement one or more of the methodologies, procedures, or functions described herein. The instructions 408 can also reside, completely or at least partially, within the main memory 404 or the processor 402 during execution thereof thereby. The main memory 404 and the processor 402 also can constitute machine-readable media.

The UGV 100 also includes a transceiver 308 communicatively coupled to the processor 402 via the bus 306. The transceiver 308 communicates with the control unit 102 via a wireless communication link 104 (e.g., a Radio Frequency ("RF") transmission). One or more antennas 218 (is)are provided to facilitate the transmission and reception of information to and from the transceiver 308 of the UGV 100.

An articulating arm 106 is mounted on the body 200 of the UGV 100. The articulating arm 106 is equipped with at least one gripper 220, which is mounted on the freestanding end thereof. One or more cameras 206, 222 is(are) also mounted on the body 200 of the UGV 100. The articulating arm 106, gripper 220 and camera(s) 206, 222 can be remotely controlled via the control unit 102.

The position of the UGV 100 is controlled through the selective activation and deactivation of the motors 302, 304 in response to control inputs generated by the control unit 102. Linear or straight-line travel of the UGV 100 is effectuated by the simultaneous activation of motors 302, 304 in the same direction and at the same speed so as to drive tracks 212, 214 in the same direction and at the same speed. Turning of the UGV 100 can be achieved by (1) simultaneously activating the motors 302, 304 in opposite directions or in the same direction at different speeds or (2) operating only one of the motors 302, 304.

Figure 5:
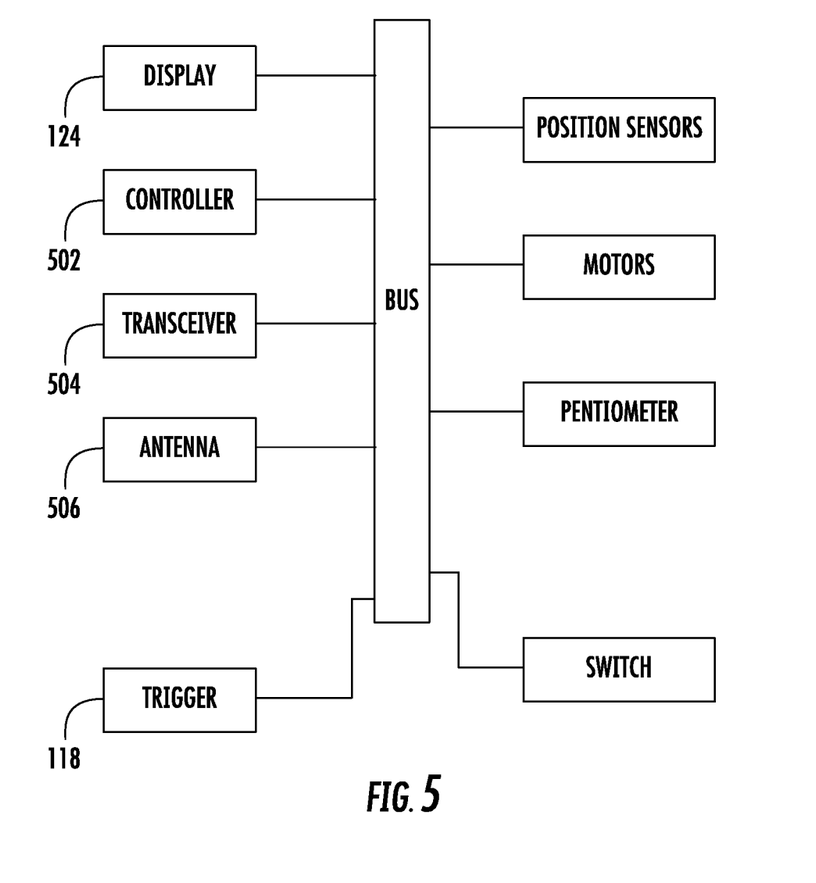
FIG. 5 is a schematic illustration of various electrical and electronic components of the control unit shown in FIG. 1.

The control unit 102 comprises a controller 502. The controller 502 is similar to or the same as the controller 216 of the UGV. As such, the controller 502 may include a processor (not shown) and memory (not shown) housed in a rigid casing (not shown). Instructions (not shown) may be stored in the memory. The instructions can be implemented as software code configured to implement one or more of the methodologies, procedures, or functions described herein. The processor and memory can constitute machine-readable media.

The control unit 102 also includes a wireless transceiver 504 communicatively coupled to the controller 502. The transceiver 504 is configured to communicate with the transceiver 308 of the UGV 100 via an RF communication link 104. An antenna 506 is provided to facilitate the transmission and reception of RF signals to and from the control unit 102.

The control unit 102 further comprises an input device 108 for providing user inputs to the controller 502. In some scenarios, the input device 108 comprises a joystick to command the vehicle's movement. In other scenarios, the input device 108 comprises a hand grip 110 movably coupled to a base 112 via a plurality of linkages 114. The hand grip 110 includes a body 116 and a trigger 118. The body 116 is sized and shaped to be grasped by the hand of an operator. The trigger 118 is movable between a rest position and a fully depressed position. In this regard, the trigger 118 is mounted on the body 116 so that the user can pull or depress the trigger using his or her index finger while grasping the hand grip 110. Buttons 120 are disposed on the hand grip 110 for providing a means to control the grippers 220, camera 222 and other operational features of the manipulator arm 106.

A display screen 124 is provided for continuously providing an optimal perspective view of a visually rendered robot or vehicle to a viewer thereof. In this regard, controller 502 of the control unit 102 is configured to perform operations for causing the automatic, dynamic and/or continuous adjustment of the perspective view direction being used to visually render the UGV. As a result of these operations, the user does not have to stop controlling the UGV for purposes of manually adjusting the perspective view being used to visually render the same. These operations can be implemented as a software application which is executed by control unit 102.

Notably, the dynamic perspective view adjustment is made based on the actual current configuration of all or a portion of the robot's/vehicle's mechanical joints. For example, the perspective view of the UGV's visual rendering is dynamically adjusted based on the actual current configuration of at least one rotary joint 228, 230, 232, 234, 236, 238 of the UGV's manipulator arm 106. The rotary joint's configuration is determined by the current angle thereof relative to a reference axis (e.g., an axis of gravity or a center axis of the UGV's chassis). Next, a determination is made as to what is the best direction to be viewing the rotary joint in order to optimally view its current configuration. For example, in the scenario where a single joint 232 is bent at a ninety degree angle, the best direction to view the same is the direction along the axis of rotation thereof.

For simplicity, the following discussion will be made with reference only to the wrist 240 portion of the six degree of freedom manipulator arm 106. As such, only the configurations of rotary joints 234 and 236 will be considered for explanatory purposes. Rotary joint 234 has an axis of rotation $a_{234}$ and rotary joint 236 has an axis of rotation $a_{236}$, as shown in FIG. 2. If only these two rotary joints 234, 236 are considered, then a determination is made as to what is the best single perspective view direction for providing an optimized overall perspective view on that combination of mechanical joints. This determination is made by considering a weighted average of two viewing direction vectors. A first direction vector specifies a viewing direction $d_{234}$ along the axis of rotation $a_{234}$, and a second direction vector $d_{236}$ specifies a viewing direction along the axis of rotation $a_{236}$. The determination is generally defined by the following mathematical equation (1).

$$\sigma = \sum_{i=1}^{n} w_i d_i \qquad (1)$$

where σ is a vector representing an Avatar View Perspective Direction ("AVPD") and $$\sum_{i=1}^{n} w_i d_i$$

represents a weighted sum of the viewing direction vectors for the axis of rotations of n mechanical joints. $w_i$ represents a weighting term associated with an $i^{th}$ mechanical joint. $d_i$ represents a viewing direction vector for the axis of rotation of an $i^{th}$ mechanical joint.

Weighting terms and viewing direction vectors are well known in the art, and therefore will not be described herein. Still, it should be understood that the weighting term is employed as a way to prioritize joints. For example, a user may mostly care about viewing the current configuration of mechanical joint 236, but also desire to have a relatively good view of mechanical joint 234. In this case, the mechanical joint 236 is considered more important than mechanical joint 234, and therefore has a higher relative priority than mechanical joint 234. As such, the weighting term for mechanical joint 236 has a higher value (e.g., 1) as compared to that of the weighting term for mechanical joint 234 (e.g., 0.5). Thus, when the two weighted viewing direction vectors are added together, the AVPD vector $\sigma_{234\text{-}236}$ shown in FIG. 2 is obtained (i.e., $\sigma_{234\text{-}236} = w_{234}d_{234} + w_{236}d_{236}$).

An additional mathematical operation may be performed to scale down the magnitude of the AVPD vector (e.g., to 1), so that the output of the algorithm always specifies a pointing direction of a magnitude x, where x is an integer (e.g., one). This scaling operation is defined by the following mathematical equation (2).

$$\sigma_{scaled} = \frac{\sigma}{\|\sigma\|} \quad (2)$$

Subsequent to determining the scaled down AVPD vector $\sigma_{scaled}$, it is used to dynamically adjust the perspective view of a visually rendered multi-dimensional model of the UGV 100 within a GUI displayed on display screen 124. In this regard, controller 502 of the control unit 102 performs operations for causing the automatic and dynamic adjustment of the UGV's visual rendering based on the determined scaled down AVPD vector $\sigma_{scaled}$. Accordingly, the virtual camera's perspective of the UGV's multi-dimensional model is set to point in the direction shown by the arrow of FIG. 2 which is designated $\sigma_{234\text{-}236}$ (i.e., the virtual camera appears to be located above and slightly to the right of mechanical joints 234 and 236). As a result of these operations, the user does not have to stop controlling the UGV 100 for purposes of manually adjusting the perspective view of the UGV's visual rendering.

Figure 6:
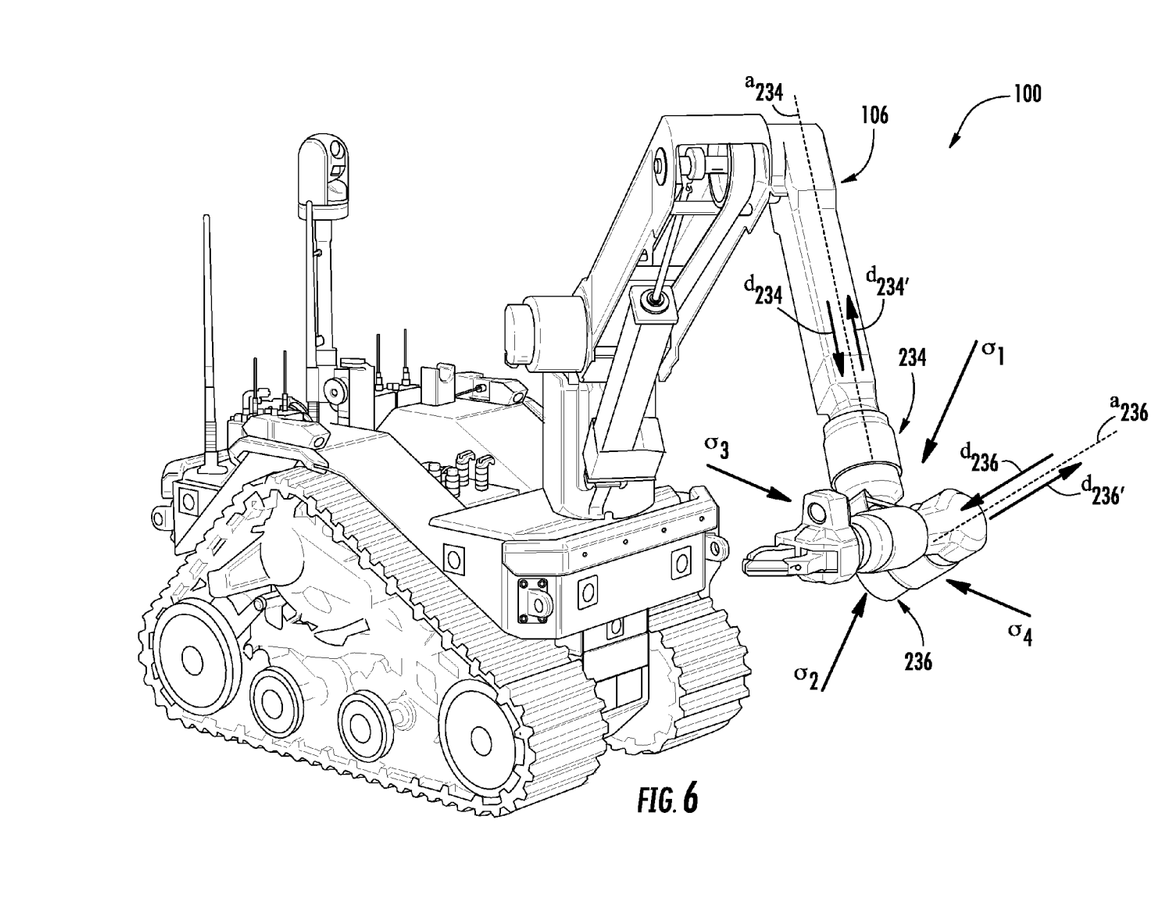
FIGS. 6 and 7 each provide a perspective view of the vehicle shown in FIG. 1.

In the forgoing discussion, only two viewing directions (i.e., those represented by arrows designed $d_{234}$ and $d_{236}$ in FIG. 2) were considered for determining the scaled down AVPD vector $\sigma_{scaled}$. The present invention is not limited in this regard. Other viewing directions may additionally or alternatively be considered. For example, as shown in FIG. 6, the viewing directions represented by the arrows referenced as $d_{234}'$ and $d_{236}'$ are equally valid viewing directions which may be considered when computing the scaled down AVPD vector $\sigma_{scaled}$. Stated more generally, each mechanical joint could be viewed equally well from a first direction $+d_i$ and/or an opposite second direction $-d_i$. As such, the mathematical operations performed by controller 502 of the control unit 102 can be configured such that all possible combinations of the $+d_i$ and $-d_i$ directions will be considered. Such mathematical operations are defined by the following mathematical equations (3) and (4).

$$\sigma = \sum_{i=1}^{n} s_i w_i d_i \text{ where } s_i \in \{+1, -1\} \quad (3)$$

$$\sigma_{scaledmax} = \frac{\sigma_{max}}{\|\sigma_{max}\|} \quad (4)$$

where $s_i$ represents a sign of the viewing direction $d_i$. $\sigma_{max}$ is a vector representing an AVPD with the largest magnitude of a plurality of AVPDs (e.g., the AVPD vector $\sigma_1$ of FIG. 6) and $\sigma_{scaledmax}$ represents a scaled down version of $\sigma_{max}$.

As should be understood, there exists a number of possible ways of combining the plurality of weighted viewing direction vectors. For example, let's assume that the weighting term for all joints is equal to one. In this case, the viewing direction vectors $d_{234}$ and $d_{236}$ may be added together to obtain the AVPD vector $\sigma_1$. Similarly, the viewing direction vectors $d_{234}'$ and $d_{236}'$ are added together to obtain the AVPD vector $\sigma_2$. The viewing direction vectors $d_{234}$ and $d_{236}'$ are added together to obtain the AVPD vector $\sigma_3$. The viewing direction vectors $d_{234}'$ and $d_{236}$ are added together to obtain the AVPD vector $\sigma_4$. Notably, the AVPD vector $\sigma_1$ has the largest magnitude of the plurality of viewing direction vectors $\sigma_1$-$\sigma_4$, and therefore is selected for use in solving mathematical equation (4). The present invention is not limited to the particulars of this example.

In other scenarios, all possible combinations of combining at least one weighted viewing direction vector for more than two mechanical joints of the manipulator arm 106 are considered for purposes of determining the optimal perspective view of the UGV's visual rendering. Additionally or alternatively, preferred viewing directions may be considered in this regard for ensuring that the view perspective is in a direction which a user would intuitively expect to see (e.g., a top view, a front view, a back view, a right side view and/or a left side view of the UGV). This will become more evident as the discussion progresses in relation to FIG. 7.

Figure 7:
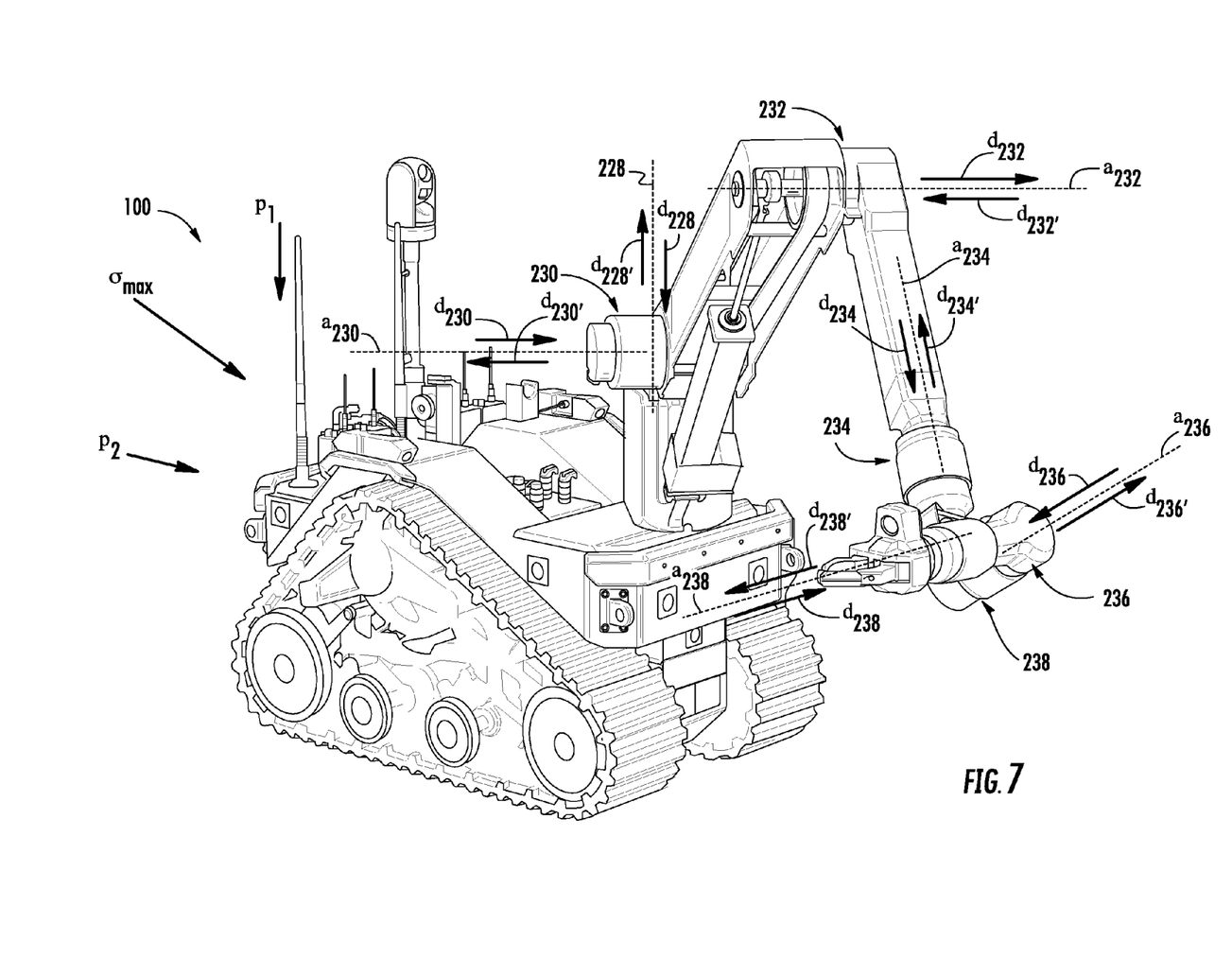

Referring now to FIG. 7, there is provided a schematic illustration that is useful for understanding a scenario in which the optimal perspective view of the UGV is determined based on two preferred view directions $p_1$, $p_2$ (e.g., a top view, a front view, a back view, a right side view and/or a left side view of the UGV) and two weighted viewing direction vectors $d_{228}$, $d_{228}'$, $d_{230}$, $d_{230}'$, $d_{232}$, $d_{232}'$, $d_{234}$, $d_{234}'$, $d_{236}$, $d_{236}'$, $d_{238}$, $d_{238}'$ for all six mechanical joints 228-238 of the manipulator arm 106. In this case, the mathematical operations performed by the controller 502 of the control unit 102 are defined by the following mathematical equation (5), as well as the above-provided mathematical equation (4).

$$\sigma = \sum_{i=1}^{n} s_i w_i d_i + p_j \text{ where } s_i \in \{+1, -1\} \text{ and } p_j \in \{p_1, \ldots, p_m\} \quad (5)$$

$p_j$ represents a preferred viewing direction. Given all possible values for $s_i$ and all possible choices of $p_j$, the combination which provides the AVPD vector with the largest magnitude is selected. Thereafter, the selected AVPD vector $\sigma_{max}$ may be scaled down using the above-provided mathematical equation (4). The AVPD vector $\sigma_{scaledmax}$ is the best overall view to show the mechanical configuration of all six mechanical joints 228-238. As such, the controller 502 performs operations to cause the UGV's multi-dimensional model to be rendered using the AVPD vector $\sigma_{scaledmax}$.

In view of the forgoing, one should appreciate that, as the manipulator arm is moving around at a relatively slow or steady rate, the perspective view of the multi-dimensional model of the UGV is gradually changing so as to continuously provide the user with the best view of the overall UGV. In some cases, the manipulator arm may be moving at a relatively fast past, and therefore may cause a shuttering effect, a spinning effect and/or a hopping effect of the perspective view within the UGV's multi-dimensional model. Accordingly, the algorithm implemented within the control unit 102 is configured to prevent such shuttering, spinning and hopping effects. In this regard, a rate limit parameter may be pre-specified to limit the rate at which the view perspective is to change. Additionally or alternatively, a pre-specified threshold setting may be employed to prevent said hopping effect. For example, let's assume that the pre-specified threshold setting has a value of ten. In this case, a change of view perspective only occurs when a newly computed AVPD vector is larger than the currently used AVPD vector by a value of ten. The present invention is not limited to the particulars of this example.

As evident from above, the algorithm implemented herein specifies an optimal view direction for an UGV's multi-dimensional model. In some scenarios, it may be desirable to change a yaw angle of the perspective view (i.e., to spin the view perspective around an axis of the UGV), but not the pitch or elevation angle thereof (or vice versa). As such, the algorithm provides a means for constraining the UGV's multi-dimensional model's yaw, pitch, roll and/or zoom by setting the values thereof. For example, a zoom value is selected such that the UGV's multi-dimensional model stays within a prescribed area of a display screen. A user can also activate or deactivate the control unit's automatic control of the view perspective. In this regard, the user can interact with the software application for toggling (1) between static and dynamic control on the fly and/or (2) to/from a standard driving view of the UGV when the manipulator arm is in its stowed position. Additionally, the software application is configured to determine the view of multiple avatars (corresponding to multiple mechanical systems) at least partially based on the position/orientation of the mechanical joints of at least one of the mechanical systems.

Figure 8:
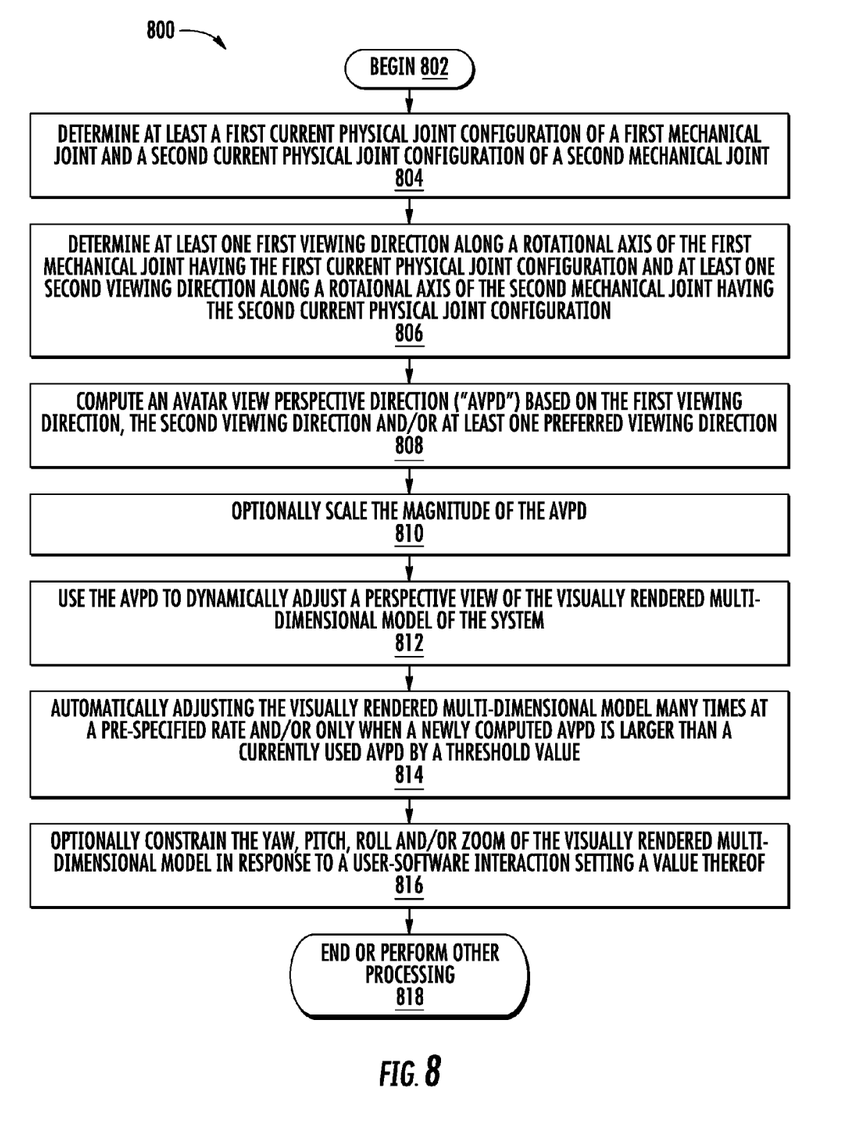
FIG. 8 provides a flow diagram of an exemplary method for visually rendering a multi-dimensional model of at least a portion of a system having a plurality of mechanical joints.

Referring now to FIG. 8, there is provided a flow diagram of an exemplary method 600 for visually rendering a multi-dimensional model (e.g., a 3D model) of at least a portion of a system (e.g., the UGV 100 of FIG. 1) having a plurality of mechanical joints (e.g., mechanical joints 228-238 of FIG. 2). Method 800 begins with step 802 and continues with optional step 804. In optional step 804, a first current physical joint configuration of a first mechanical joint (e.g., mechanical joint 234 of FIG. 2) is determined. Similarly, a second current physical joint configuration of a second mechanical joint (e.g., mechanical joint 236 of FIG. 2) is determined. Next in step 806, at least one first viewing direction (e.g., direction $d_{234}$ of FIG. 2) is determined along a rotational axis (e.g., axis $a_{234}$ of FIG. 2) of the first mechanical joint having the first current physical joint configuration. Likewise, at least one second viewing direction (e.g., direction $d_{236}$ of FIG. 2) is determined along a rotational axis (e.g., axis $a_{236}$ of FIG. 2) of the second mechanical joint having the second current physical joint configuration. Notably, in some scenarios, the axes are not rotational axes but rather axes perpendicular to the linear extension axes of a linear joint. Thereafter, an AVPD is computed based on the first viewing direction, the second viewing direction and/or at least one preferred viewing direction, as shown by step 808. This computation can involve computing a weighted average of at least the viewing directions. The magnitude of the AVPD may then be optionally scaled in step 810. Upon completing step 808 or 810, the AVPD is used in step 812 to dynamically adjust a perspective view of the visually rendered multi-dimensional model of the system.

Subsequently, the perspective view of the visually rendered multi-dimensional model is automatically adjusted in step 814: many times at a pre-specified rate of change; and/or only when a newly computed AVPD is larger than a currently used AVPD by a threshold value. The yaw, pitch, roll or zoom of the visually rendered multi-dimensional model may also be optionally constrained in response to a user-software interaction setting a value thereof, as shown by step 816. After completing step 816, step 818 is performed where method 800 ends or other processing is performed.

Figure 9:
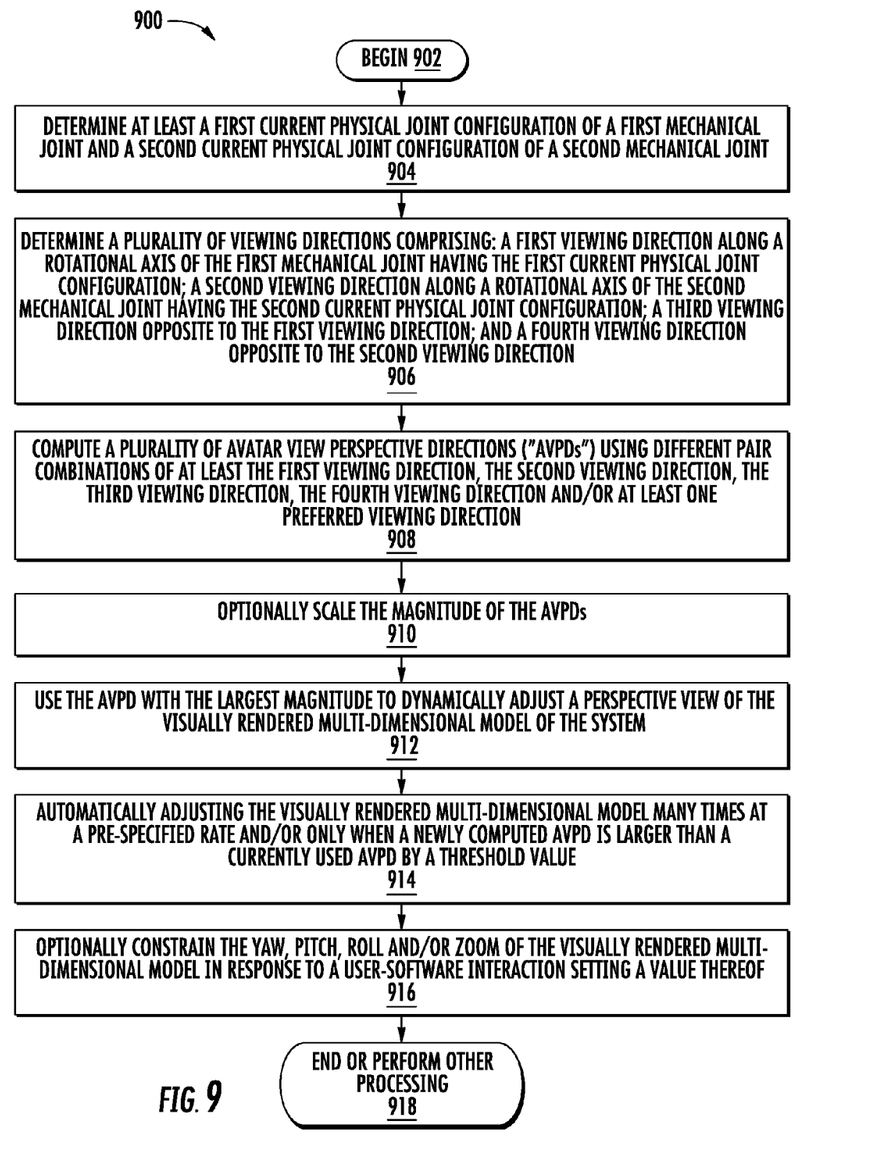
FIG. 9 provides a flow diagram of an exemplary method for visually rendering a multi-dimensional model of at least a portion of a system having a plurality of mechanical joints.

Referring now to FIG. 9, there is provided a flow diagram of an exemplary method 900 for visually rendering a multi-dimensional model (e.g., a 3D model) of at least a portion of a system (e.g., the UGV 100 of FIG. 1) having a plurality of mechanical joints (e.g., mechanical joints 228-238 of FIG. 2). Method 900 begins with step 902 and continues with optional step 904. In optional step 904, a first current physical joint configuration of a first mechanical joint (e.g., mechanical joint 234 of FIG. 2) is determined. Similarly, a second current physical joint configuration of a second mechanical joint (e.g., mechanical joint 236 of FIG. 2) is determined. Next in step 906, a plurality of viewing direction is determined. These viewing directions comprises: a first viewing direction (e.g., direction $d_{234}$ of FIG. 2) along a rotational axis (e.g., axis $a_{234}$ of FIG. 2) of the first mechanical joint having the first current physical joint configuration; a second viewing direction (e.g., direction $d_{236}$ of FIG. 2) along a rotational axis (e.g., axis $a_{236}$ of FIG. 2) of the second mechanical joint having the second current physical joint configuration; a third viewing direction opposite to the first viewing direction; and a fourth viewing direction opposite to the second viewing direction.

Thereafter, a plurality of AVPDs are computed using different pair combinations of at least the first viewing direction, the second viewing direction, the third viewing direction, the fourth viewing direction and/or at least one preferred viewing direction, as shown by step 908. This computation can involve computing a weighted average of the viewing directions for each combination pair. The magnitude of the AVPDs may then be optionally scaled in step 910. Upon completing step 908 or 910, the AVPD with the largest magnitude is used in step 912 to dynamically adjust a perspective view of the visually rendered multi-dimensional model of the system.

Subsequently, the perspective view of the visually rendered multi-dimensional model is automatically adjusted in step 914: many times at a pre-specified rate of change; and/or only when a newly computed AVPD is larger than a currently used AVPD by a threshold value. The yaw, pitch, roll or zoom of the visually rendered multi-dimensional model may also be optionally constrained in response to a user-software interaction setting a value thereof, as shown by step 916. After completing step 916, step 918 is performed where method 900 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention.

More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for visually rendering a multi-dimensional model of at least a portion of a system having a plurality of mechanical joints, comprising:
   determining, by an electronic circuit, a first current physical joint configuration of a first mechanical joint and a second current physical joint configuration of a second mechanical joint;
   determining, by the electronic circuit, at least one first viewing direction along a rotational axis or perpendicular to a linear extension axis of the first mechanical joint having the first current physical joint configuration and at least one second viewing direction along a rotational axis or perpendicular to a linear extension axis of the second mechanical joint having the second current physical joint configuration, wherein the determination of the first and second viewing directions is absent of a user input requirement;
   computing, by the electronic circuit, an Avatar View Perspective Direction ("AVPD") based exclusively on a weighted average of at least the first and second viewing directions; and
   dynamically adjusting, by the electronic circuit, a perspective view of a visually rendered multi-dimensional model of the system using the AVPD which was previously computed.

2. The method according to claim 1, wherein the system is an unmanned ground vehicle.

3. The method according to claim 1, wherein the plurality of mechanical joints is part of a manipulator arm.

4. The method according to claim 1, wherein the AVPD is further based on at least one preferred viewing direction.

5. The method according to claim 1, further comprising scaling a magnitude of the AVPD prior to using the AVPD to dynamically adjust the perspective view of the visually rendered multi-dimensional model of the system.

6. The method according to claim 1, further comprising automatically adjusting the perspective view of the visually rendered multi-dimensional model many times at a pre-specified rate of change.

7. The method according to claim 1, further comprising automatically adjusting the perspective view of the visually rendered multi-dimensional model only when a newly computed AVPD is larger than a currently used AVPD by a threshold value.

8. The method according to claim 1, further comprising constraining a yaw, pitch, roll or zoom of the visually rendered multi-dimensional model in response to a user-software interaction setting a value thereof.

9. A system, comprising:
   at least one electronic circuit configured to:
      determine a first current physical joint configuration of a first mechanical joint and a second current physical joint configuration of a second mechanical joint;
      determine at least one first viewing direction along a rotational axis or perpendicular to a linear extension axis of the first mechanical joint having the first current physical joint configuration and at least one second viewing direction along a rotational axis or perpendicular to a linear extension axis of the second mechanical joint having the second current physical joint configuration, wherein the determination of the first and second viewing directions is absent of a user input requirement;
      compute an Avatar View Perspective Direction ("AVPD") based exclusively on a weighted average of at least the first and second viewing directions; and
      dynamically adjust a perspective view of a visually rendered multi-dimensional model of the system using the AVPD.

10. The system according to claim 9, wherein the system is an unmanned ground vehicle.

11. The system according to claim 9, wherein the first and second mechanical joints are part of a manipulator arm.

12. The system according to claim 9, wherein the AVPD is further based on at least one preferred viewing direction.

13. The system according to claim 9, wherein the electronic circuit is further configured to scale a magnitude of the AVPD prior to using the AVPD to dynamically adjust the perspective view of the visually rendered multi-dimensional model of the system.

14. The system according to claim 9, wherein the electronic circuit is further configured to automatically adjust the perspective view of the visually rendered multi-dimensional model many times at a pre-specified rate of change.

15. The system according to claim 9, further comprising wherein the electronic circuit is further configured to automatically adjust the perspective view of the visually rendered multi-dimensional model only when a newly computed AVPD is larger than a currently used AVPD by a threshold value.

16. The system according to claim 9, wherein the electronic circuit is further configured to constrain a yaw, pitch, roll or zoom of the visually rendered multi-dimensional model in response to a user-software interaction setting a value thereof.

17. A method for visually rendering a multi-dimensional model of at least a portion of a system having a plurality of mechanical joints, comprising:
   determining, by an electronic circuit, a first current physical joint configuration of a first mechanical joint and a second current physical joint configuration of a second mechanical joint;
   determining at least one first viewing direction along a rotational axis or perpendicular to a linear extension axis of the first mechanical joint having the first current physical joint configuration and at least one second viewing direction along a rotational axis or perpendicular to a linear extension axis of the second mechanical joint having the second current physical joint configuration;
   computing an Avatar View Perspective Direction ("AVPD") based on the first and second viewing directions;

dynamically adjusting a perspective view of a visually rendered multi-dimensional model of the system using the AVPD;

determining, by the electronic circuit, at least one third viewing direction opposite to the first viewing direction and a fourth viewing direction opposite to the second viewing direction;

computing a plurality of AVPDs using different pair combinations of the first, second, third and fourth viewing directions; and using the AVPD of the plurality of AVPDs with a largest magnitude to dynamically adjust the perspective view of the visually rendered multi-dimensional model of the system.

18. A system, comprising:
at least one electronic circuit configured to:
  determine a first current physical joint configuration of a first mechanical joint and a second current physical joint configuration of a second mechanical joint;
  determine at least one first viewing direction along a rotational axis or perpendicular to a linear extension axis of the first mechanical joint having the first current physical joint configuration and at least one second viewing direction along a rotational axis or perpendicular to a linear extension axis of the second mechanical joint having the second current physical joint configuration;
  compute an Avatar View Perspective Direction ("AVPD") based on the first and second viewing directions;
  dynamically adjust a perspective view of a visually rendered multi-dimensional model of the system using the AVPD;
  determine at least one third viewing direction opposite to the first viewing direction and a fourth viewing direction opposite to the second viewing direction;
  compute a plurality of AVPDs using different pair combinations of the first, second, third and fourth viewing directions; and
  use the AVPD of the plurality of AVPDs with a largest magnitude to dynamically adjust the perspective view of the visually rendered multi-dimensional model of the system.

* * * * *